April 27, 1943.                M. H. GROVE ET AL                2,317,376
                               FLOW CONTROL DEVICE
                             Filed April 15, 1942           2 Sheets-Sheet 1
FIG_1_
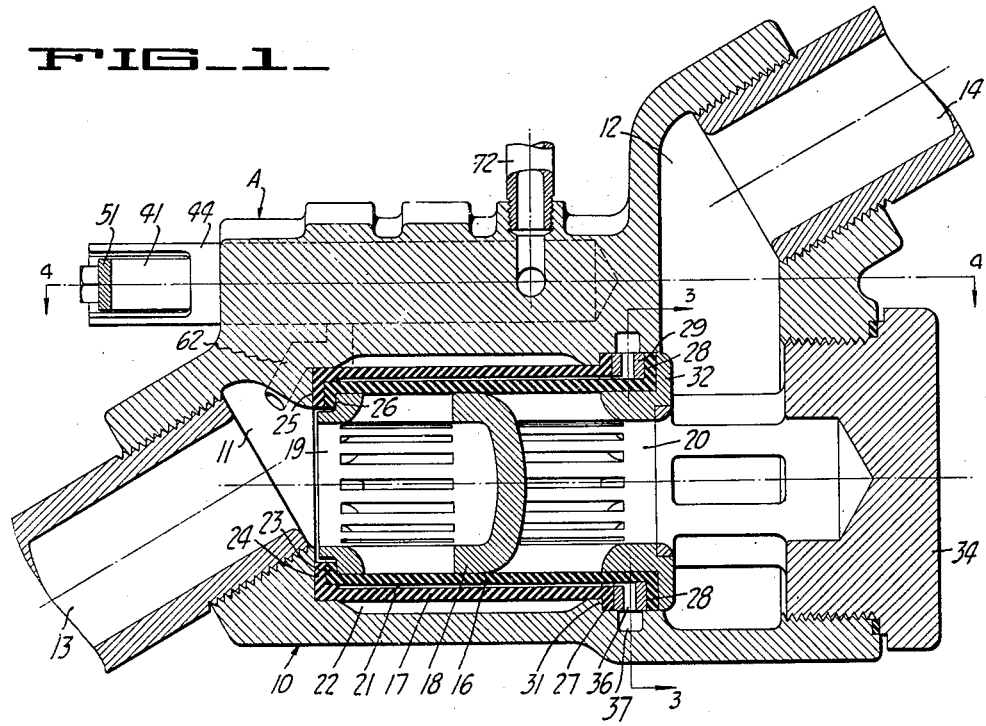
FIG_2_
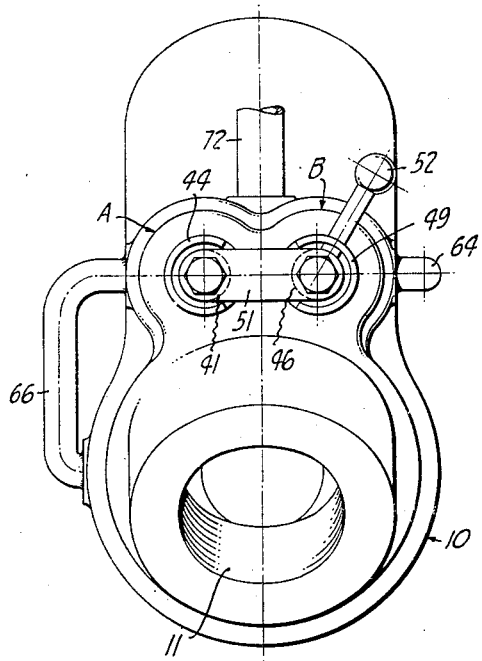
FIG_3_
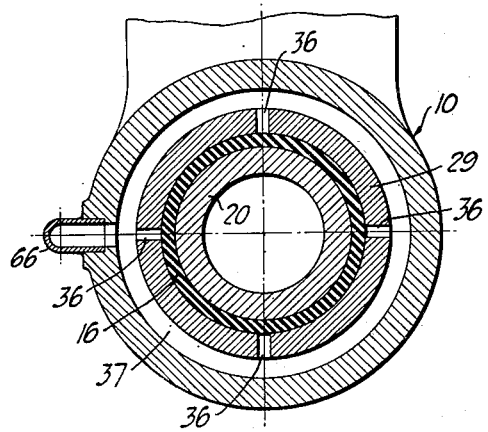
INVENTORS
Marvin H. Grove
Austin U. Bryant
BY Paul D. Flehr
ATTORNEY April 27, 1943.   M. H. GROVE ET AL   2,317,376
FLOW CONTROL DEVICE
Filed April 15, 1942   2 Sheets-Sheet 2
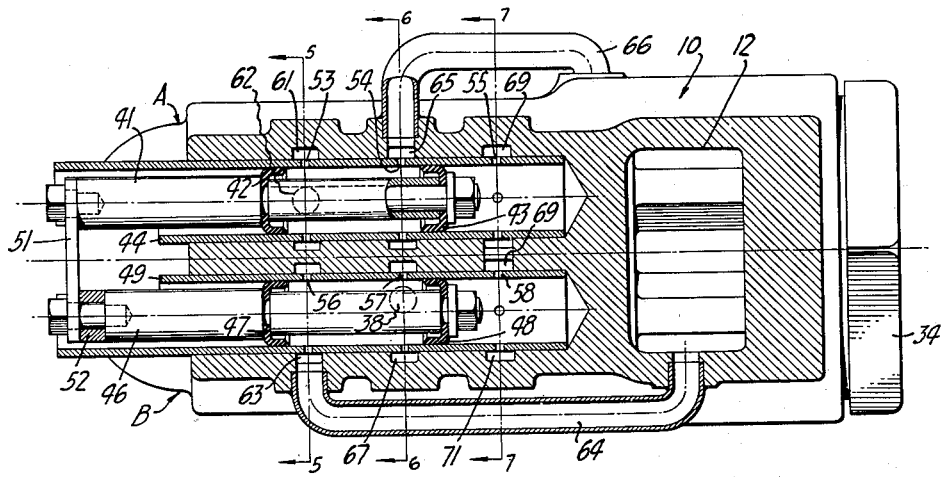
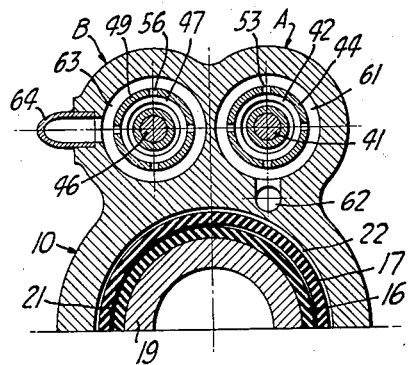
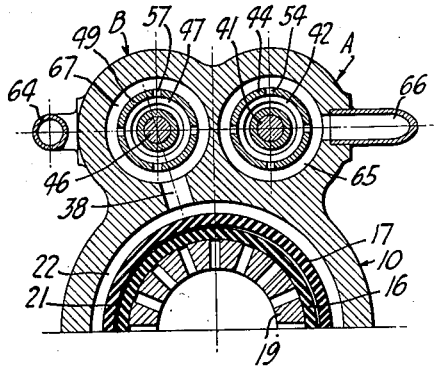
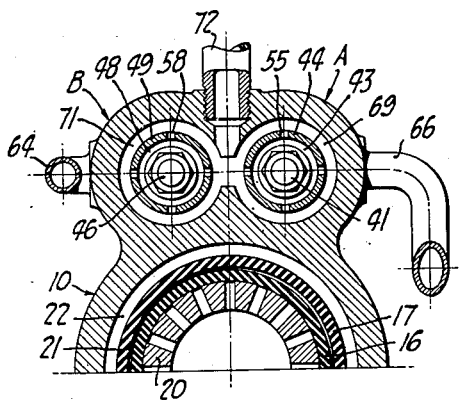
INVENTORS
Marvin H. Grove
Austin U. Bryant
BY Paul D. Flehr
ATTORNEY Patented Apr. 27, 1943

2,317,376

UNITED STATES PATENT OFFICE 2,317,376

FLOW CONTROL DEVICE

Marvin H. Grove, Piedmont, and Austin U. Bryant, Berkeley, Calif., assignors to Fluid Control Engineering Co., a copartnership Application April 15, 1942, Serial No. 438,994

4 Claims. (Cl. 137—139)

This invention relates generally to valves for controlling flow of various fluids, including both gases and liquids. More particularly, it relates to valves of the type making use of a tube or sleeve formed of resilient material, and which is operated by means of a controlling fluid pressure to permit or interrupt flow of fluid through the valve body.

In copending application Serial No. 429,258, filed February 2, 1942, there is disclosed a type of fluid control valve making use of a tube or sleeve formed of resilient material like soft vulcanized rubber. The resilient tube in that instance has its ends sealed with respect to the valve body about the inlet and outlet passages, and a chamber or space is formed about the tube for receiving a controlling fluid pressure. A circular barrier is disposed within the tube intermediate its ends. The tube may assume two main operating positions depending upon the fluid pressure applied to the chamber. In closed position the tube interrupts flow of fluid though the body by sealing upon the periphery of the barrier, while in open position the tube is expanded by inlet pressure to permit fluid flow. The controlling fluid may be from an independent external source, or it may be fluid taken from the inlet side of the valve.

It is an object of the present invention to provide a valve of the above type capable of application in certain types of service, particularly where one desires to effect control from two sources of fluid pressure.

Another object of the invention is to provide a valve of the above type which can be operated with a reversal of flow, and with use of fluid pressure taken from the line to cause the desired opening and closing action.

Additional objects of the invention will appear from the following description in which the preferred embodiment has been set forth in detail in conjunction with the accompanying drawings.

Referring to the drawings:

Figure 1 is a side elevational view, in cross section, illustrating a valve incorporating the present invention;

Figure 2 is an end view of the valve shown in Figure 1, looking from the left;

Figure 3 is a cross sectional detail taken along the line 3—3 of Figure 1;

Figure 4 is a cross sectional detail taken along the line 4—4 of Figure 1;

Figure 5 is a cross sectional detail taken along the line 5—5 of Figure 4;

Figure 6 is a cross sectional detail taken along the line 6—6 of Figure 4; and

Figure 7 is a cross sectional detail taken along the line 7—7 of Figure 4.

The valve as illustrated in the drawings consists of a body 10 having the passages 11 and 12 for connection with the fluid piping 13 and 14. The interior of the body is bored to receive a pair of concentric tubes or sleeves 16 and 17, which are formed of suitable resilient material such as soft vulcanized rubber or resilient synthetic rubber.

A circularly contoured barrier 18 is disposed within the tube 16 and is retained in place by the slotted sleeves 19 and 20. The space 21 between the tubes 16 and 17 forms a space or chamber for receiving fluid under pressure, and the body is also constructed to form a chamber 22 which surrounds the outer tube 17.

In order to seal the end portions of the tubes together and to the body, the tubes are shown provided with adjacent flanges 23 and 24, which are clamped between the annular shoulder 25 formed on the body and the adjacent annular clamping shoulder 26 formed on the slotted sleeve 19. The other ends of the tubes have spaced flanges 27 and 28 which are separated by the spacer ring 29. The flanges 27 and 28 together with ring 29 are clamped between the annular shoulder 31 formed on the body and the annular shoulder 32 formed on the slotted sleeve 20. The assembly comprising the barrier 18 and the slotted sleeves 19 and 20 is urged into clamping engagement with the end flanges of the resilient tubes by the threaded body closure 34.

The spacer ring 29 is provided with ducts 36 which communicate with the inner space 21 and with an annular body duct 37. Another duct 38 in the body communicates with the chamber or space 22 surrounding the outer tube 17.

With the arrangement so far described, when fluid under pressure is applied to the space 21 between the tubes 16 and 17, the inner tube 16 is caused to seal upon the periphery of the barrier 18, with expansion of the outer tube 17. When fluid pressure is applied to chamber 22, while chamber 21 is vented, tube 17 will press inwardly upon the tube 16 to again cause this tube to seal upon the periphery of the barrier 18. When both spaces 21 and 22 are vented, fluid pressure applied to each passage 11 or 12 can expand both tubes 16 and 17 to permit fluid to pass about the barrier.

In many instances it is desirable to use fluid taken directly from the line for controlling opening and closing, instead of using fluid pressure from external sources. Also it is frequently desirable to permit full reversal of flow, that is, to be able to effect opening and closing action of the valve for flow from either direction. The valve means A and B, together with the connecting ducts employed, make possible such an arrangement. This valve means may vary as to details, and may be located either close to the main valve, or at a remote point. In the present instance the valve elements are mounted within the body, and are arranged for manual operation. The valve A includes a plunger 41 which carries the spaced cup washers 42 and 43. These washers fit within a tubular liner 44 mounted within the body. Valve B similarly includes the plunger 46, cup washers 47 and 48, and liner 49. The outer ends of plungers 41 and 46 are connected by bar 51, and a manual lever 52 is provided to move both plungers between two limiting positions. Sleeve 44 for valve A is provided with spaced ports 53, 54 and 55, and the liner 49 for valve B is similarly provided with ports 56, 57 and 58. Ducts 61 and 62 in the body (Figures 1, 4 and 5) establish communication between ports 53 and the body passage 11. Duct 63 (Figure 5) together with pipe 64 establishes communication between ports 56 for valve B, and the other main body passage 12.

Ports 54 for the valve A are connected by duct 65 and pipe 66 to the annular duct 37 in the body, which in turn communicates with the ducts 36 in the spacer ring 29 (Figure 3). Ports 57 for the valve B connect with the annular body duct 67, which in turn connects with duct 38 for establishing communication with the chamber 22 (Figure 6). Both ports 55 and 58 of the valves A and B communicate with ducts 69 and 71, and these ducts in turn connect with the venting pipe 72. Pipe 72 may discharge to the atmosphere or some other point of relatively low pressure.

Figure 4 shows one limiting position for the two valves A and B. When in the other limiting position, cup washers 42 and 47 are intermediate ports 53 and 54, and ports 56 and 57, respectively. Cup washers 43 and 48 occupy positions to the right of the ports 55 and 58, for their other limiting position.

Operation of the complete device described above can be outlined as follows: It will be presumed that the valve is connected in a fluid system, where at different times or under different operating conditions flow may occur from either side of the valve. If it is desired to permit flow to occur from either direction, the valve means A and B is placed in the position illustrated in the drawings. If inlet pressure is being applied to passage 11, then this pressure is transmitted through ducts 61 and 62, ports 53 and 54 of valve A, duct 56 in pipe 66, and thence through the annular duct 37 and the duct 36 of the spacer ring 29 to the inner chamber or space 21 between the two resilient tubes 16 and 17. As previously explained, application of fluid pressure in this manner to chamber 21 serves to retain the inner tube sealed with respect to the barrier 18.

If the valve is subject to a flow reversal, passage 12 now becomes the inlet, and fluid pressure is now transmitted to the outer chamber 22, through pipe 64, annular duct 63, ports 56, 57, duct 67, and from thence by duct 38 to the outer chamber 22. As previously pointed out, the pressure applied in this chamber likewise serves to retain the inner tube 16 closed upon the barrier, although at this time there may be substantially no pressure within chamber 21.

In order to open the valve, one moves the plungers 41 and 46 to the other limiting position previously described. This serves to vent both the passages 21 and 22 to the atmosphere, by way of pipe 72. Thus chamber 21 is vented because pipe 66 is placed in communication with venting pipe 72, through ports 54 and 55, and the duct 69. Chamber 22 is vented because ducts 38 and 67 communicate with pipe 72 throughout ports 57 and 58 and the duct 71. At this time communication between the passages 11 and 12 is interrupted, because cup washers 42 and 47 are positioned intermediate ports 53 and 54, and the ports 56 and 57, respectively.

It will be evident that we have provided a valve of particular utility for certain applications. Full flow reversal is made possible in the preferred embodiment as described above, and this is accomplished without the use of extra check valves. Aside from its use as a reversible flow valve, it is possible to connect the chambers 21 and 22 to separate and independent sources of controlling fluid under pressure, whereby fluid can be applied from either source to close the valve.

We claim:

1. In a flow control device, a body having passages for flow of fluid, a tube of resilient material disposed within the body and having its ends sealed with respect to the body about the passages, a circularly contoured barrier disposed within the tube intermediate the ends of the same, the adjacent annular portion of the tube being adapted to engage and seal upon the periphery of the barrier, a second tube of resilient material surrounding the first tube, the ends of the second tube being sealed with respect to the end portions of the first tube, the space between said tubes being adapted to receive fluid under pressure, and means forming a closed fluid chamber about the second named tube, said last named chamber being likewise adapted to receive fluid under pressure.

2. In a flow control device, a body having passages for flow of fluid, a tube of resilient material disposed within the body and having its ends sealed with respect to the body about the passages, a circularly contoured barrier disposed within the tube intermediate the ends of the same, the adjacent annular portion of the tube being adapted to engage and seal upon the periphery of the barrier, means disposed within the end portions of the tube on opposite sides of the barrier to prevent inward collapsing of the tube, a second tube of resilient material disposed upon the first tube and having its ends sealed with respect to the end portions of the first tube, means forming a closed annular fluid chamber about the second tube, and a separate means of fluid communication with the space between said tubes and with the chamber surrounding the second tube, whereby fluid under pressure can be introduced into or vented from each of said spaces.

3. In a flow control device, a body having passages for flow of fluid, a tube of resilient material disposed within the body and having its ends sealed with respect to the body about the passages, a circularly contoured barrier disposed within the tube intermediate the ends of the same, the adjacent annular portion of the tube being adapted to engage and seal upon the periphery of the barrier, a second tube of resilient material disposed about the first tube and having its ends sealed with respect to the end portions of the first tube, means forming a closed annular fluid chamber about the second tube, ducts serving to establish communication between one of the passages of the body and the space between said tubes, ducts serving to establish communication between the other passage of the body and the annular chamber surrounding the second tube, and control valve means associated with said ducts for venting fluid from both the space between the tubes and said chamber.

4. In a flow control device, a body having passages for flow of fluid, a tube of resilient material disposed within the body and having its ends sealed with respect to the body about the passages, a circularly contoured barrier disposed within the tube intermediate the ends of the same, the adjacent annular portion of the tube being adapted to engage and seal upon the periphery of the barrier, a second tube of resilient material disposed about the first tube and having its ends sealed with respect to the end portions of the first tube, means forming a closed annular fluid chamber about the second tube, ducts serving to establish fluid communication between one of the passages of the body and the space between said tubes, ducts serving to establish fluid communication between the other passage of the body and the annular chamber surrounding the second tube, and valve means including a common operating member movable in either one of two limiting positions, said valve means for one limiting position of the operating member serving to establish fluid communication between one passage of the body and the space between said tubes and between the other passage of the body and the annular chamber surrounding the second tube, and in the other position of the operating member serving to vent both the space between the tubes and the annular chamber surrounding the second tube.

MARVIN H. GROVE.
AUSTIN U. BRYANT.